(12) United States Patent
Uhlich et al.

(10) Patent No.: US 12,367,890 B2
(45) Date of Patent: Jul. 22, 2025

(54) AUDIO SOURCE SEPARATION AND AUDIO DUBBING

(71) Applicant: Sony Group Corporation, Tokyo (JP)

(72) Inventors: Stefan Uhlich, Stuttgart (DE); Giorgio Fabbro, Stuttgart (DE); Marc Ferras Font, Stuttgart (DE); Falk-Martin Hoffmann, Stuttgart (DE); Thomas Kemp, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 333 days.

(21) Appl. No.: 17/925,025

(22) PCT Filed: Mar. 17, 2021

(86) PCT No.: PCT/EP2021/056828
§ 371 (c)(1),
(2) Date: Nov. 14, 2022

(87) PCT Pub. No.: WO2021/239285
PCT Pub. Date: Dec. 2, 2021

(65) Prior Publication Data
US 2023/0186937 A1 Jun. 15, 2023

(30) Foreign Application Priority Data
May 29, 2020 (EP) ..................................... 20177598

(51) Int. Cl.
*G10L 21/028* (2013.01)
*G10H 1/36* (2006.01)
(Continued)

(52) U.S. Cl.
CPC ........... *G10L 21/028* (2013.01); *G10H 1/361* (2013.01); *G10L 13/04* (2013.01); *G10L 15/08* (2013.01);
(Continued)

(58) Field of Classification Search
CPC ....... G10L 21/028; G10L 13/04; G10L 15/08; G10L 15/22; G10L 25/18;
(Continued)

(56) References Cited

U.S. PATENT DOCUMENTS 11,514,885 B2 * 11/2022 Gabryjelski ............ G10L 13/00
2010/0070274 A1 * 3/2010 Cho ........................ G10L 15/20
704/226

(Continued)

FOREIGN PATENT DOCUMENTS

CN 106157485 A * 11/2016
EP 3239981 A1 11/2017
(Continued)

OTHER PUBLICATIONS

Kumar et al., "MelGAN: Generative Adversarial Networks for Conditional Waveform Synthesis," Advances in Neural Information Processing Systems. 2019, 14 pages.
(Continued)

*Primary Examiner* — Abul K Azad
(74) *Attorney, Agent, or Firm* — XSENSUS LLP

(57) ABSTRACT

An electronic device having a circuitry configured to perform audio source separation on an audio input signal to obtain a separated source and configured to perform audio dubbing on the separated source based on replacement conditions to obtain a personalized separated source.

14 Claims, 14 Drawing Sheets

(51) Int. Cl.
*G10L 13/04* (2013.01)
*G10L 15/08* (2006.01)
*G10L 15/22* (2006.01)
*G10L 25/18* (2013.01)
*H04S 3/00* (2006.01)

(52) U.S. Cl.
CPC .............. *G10L 15/22* (2013.01); *G10L 25/18* (2013.01); *G10H 2210/005* (2013.01); *G10L 2015/088* (2013.01); *H04S 3/008* (2013.01); *H04S 2400/01* (2013.01)

(58) Field of Classification Search
CPC .............. G10L 2015/088; G10L 15/26; G10L 21/0272; G10L 21/00; G10H 1/361; G10H 2210/005; G10H 2210/056; G10H 2250/311; H04S 3/008; H04S 2400/01; G06N 3/044; G06N 3/045; G06N 3/047; G06N 3/088
See application file for complete search history.

(56) References Cited

U.S. PATENT DOCUMENTS

| | | | |
|---|---|---|---|
| 2010/0280828 | A1 | 11/2010 | Fein et al. |
| 2011/0219940 | A1 | 9/2011 | Jiang |
| 2013/0151251 | A1 | 6/2013 | Herz et al. |
| 2015/0149183 | A1* | 5/2015 | Hennequin ............ G10L 19/26 704/278 |
| 2015/0380014 | A1* | 12/2015 | Le Magoarou ......... G10L 25/81 704/258 |
| 2016/0093316 | A1 | 3/2016 | Pacquier et al. |
| 2018/0122403 | A1* | 5/2018 | Koretzky .............. G10L 21/028 |
| 2019/0102138 | A1 | 4/2019 | Valdez |
| 2021/0174781 | A1* | 6/2021 | Chen ...................... G10L 13/08 |
| 2021/0224319 | A1* | 7/2021 | Ingel .................... G06F 16/686 |
| 2021/0352380 | A1* | 11/2021 | Duncan .............. H04N 21/4884 |

FOREIGN PATENT DOCUMENTS

| | | |
|---|---|---|
| EP | 3201917 B1 | 11/2021 |
| WO | 2008132265 A1 | 11/2008 |

OTHER PUBLICATIONS

Shen et al., "Natural TTS Synthesis by Conditioning Wavenet on MEL Spectrogram Predictions," 2018 IEEE International Conference on Acoustics, Speech and Signal Processing (ICASSP). IEEE, 2018, 5 pages.

Prenger et al., "Waveglow: A flow-Based Generative Network for Speech Synthesis," ICASSP 2019—2019 IEEE International Conference on Acoustics, Speech and Signal Processing (ICASSP). IEEE, 2019, 5 pages.

Jia et al., "Transfer Learning from Speaker Verification to Multispeaker Text-To-Speech Synthesis," Advances in Neural Information Processing Systems, 2018, 15 pages.

Jin et al., "VoCo: Text-based Insertion and Replacement in Audio Narration," ACM Transactions on Graphics 36(4), Article 96, Jul. 2017, 13 pages.

Uhlich et al. "Improving Music Source Separation Based on Deep Neural Networks Through Data Augmentation and Network Blending," 2017 IEEE International Conference on Acoustics, Speech and Signal Processing (ICASSP). IEEE, 2017. pp 261-265.

International Search Report and Written Opinion mailed on May 20, 2021, received for PCT Application PCT/EP2021/056828, filed on Mar. 17, 2021, 9 pages.

* cited by examiner

| Name A | Name B |
|---|---|
| Angie | Tara |

Replace "Angie" by "Tara"

| Phrase 1 | Phrase 2 |
|---|---|
| "cut the head" | "fatally injured" |
| "cursed" | "fought" |
| "killed" | "wounded" |

Replace "cut the head" by "fatally injured"

| Age | Phrase 1 | Phrase 2 |
|---|---|---|
| 18>Age>15 | Konan cut the head of his opponent | Konan fatally injured his opponent |
| 15>Age>9 | Konan cut the head of his opponent | Konan fought with his opponent |
| Age<9 | Konan cut the head of his opponent | Konan wounded his enemy |

Replace "Konan cut the head of his opponent" by "Konan fought with his opponent"

BRIEF DESCRIPTION OF THE DRAWINGS

AUDIO SOURCE SEPARATION AND AUDIO DUBBING

CROSS-REFERENCE TO RELATED APPLICATIONS

The present application is based on PCT filing PCT/EP2021/056828, filed Mar. 17, 2021, which claims priority to EP 20177598.8, filed May 29, 2020, the entire contents of each are incorporated herein by reference.

TECHNICAL FIELD

The present disclosure generally pertains to the field of audio processing, and in particular, to devices, methods and computer programs for audio personalization.

TECHNICAL BACKGROUND

There is a lot of audio content available, for example, in the form of compact disks (CD), tapes, audio data files which can be downloaded from the internet, but also in the form of sound tracks of videos, e.g. stored on a digital video disk or the like, etc.

Typically, audio content is already mixed from original audio source signals, e.g. for a mono or stereo setting, without keeping original audio source signals from the original audio sources which have been used for production of the audio content.

However, there exist situations or applications where a remixing or upmixing of the audio content would be desirable. For instance, in situations where the audio content is to shall be played on a device having more audio channels available than the audio content provides, e.g. mono audio content to be played on a stereo device, stereo audio content to be played on a surround sound device having six audio channels, etc. In other situations, the perceived spatial position of an audio source shall be amended, or the perceived loudness of an audio source shall be amended.

Although there generally exist techniques for remixing audio content, it is generally desirable to improve methods and apparatus for audio personalization.

SUMMARY

According to a first aspect the disclosure provides an electronic device comprising circuitry configured to perform audio source separation on an audio input signal to obtain a separated source and to perform audio dubbing on the separated source based on replacement conditions to obtain a personalized separated source.

According to a second aspect the disclosure provides a method comprising: performing audio source separation on an audio input signal to obtain a separated source; and performing dubbing on the separated source based on replacement conditions to obtain a personalized separated source.

According to a third aspect the disclosure provides a computer program comprising instructions, the instructions when executed on a processor causing the processor to perform audio source separation on an audio input signal to obtain a separated source; and to perform dubbing on the separated source based on replacement conditions to obtain a personalized separated source.

Further aspects are set forth in the dependent claims, the following description and the drawings.

BRIEF DESCRIPTION OF THE DRAWINGS

Figure 1:
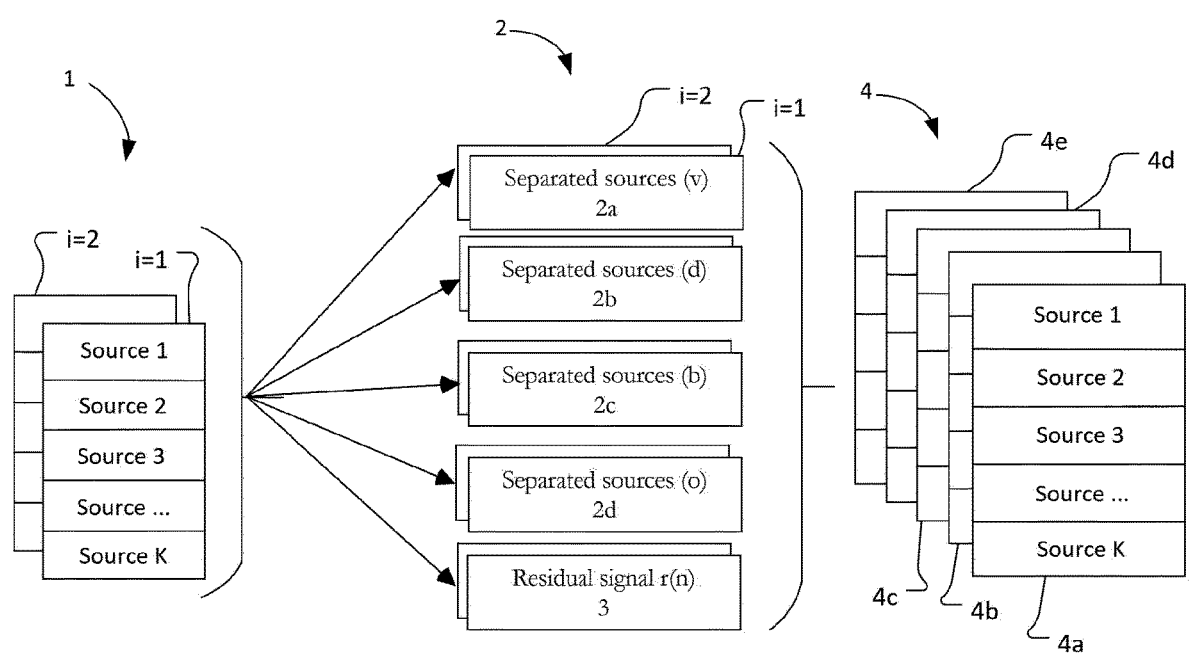
Figure 2:
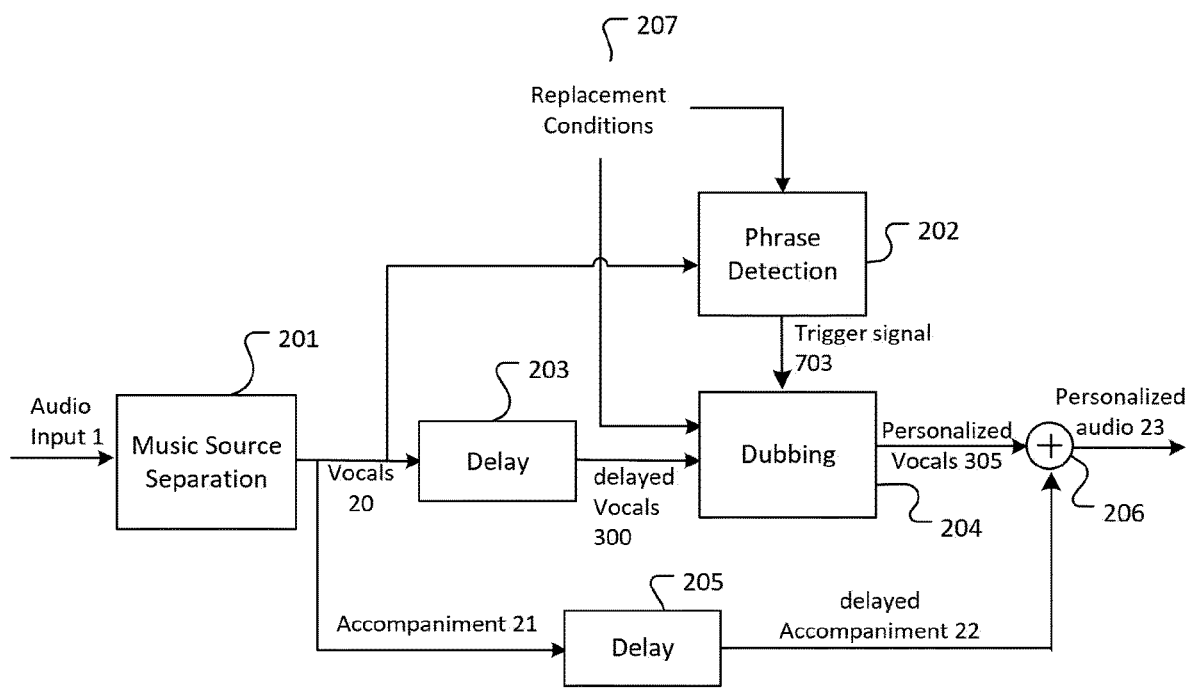
Figure 3A:
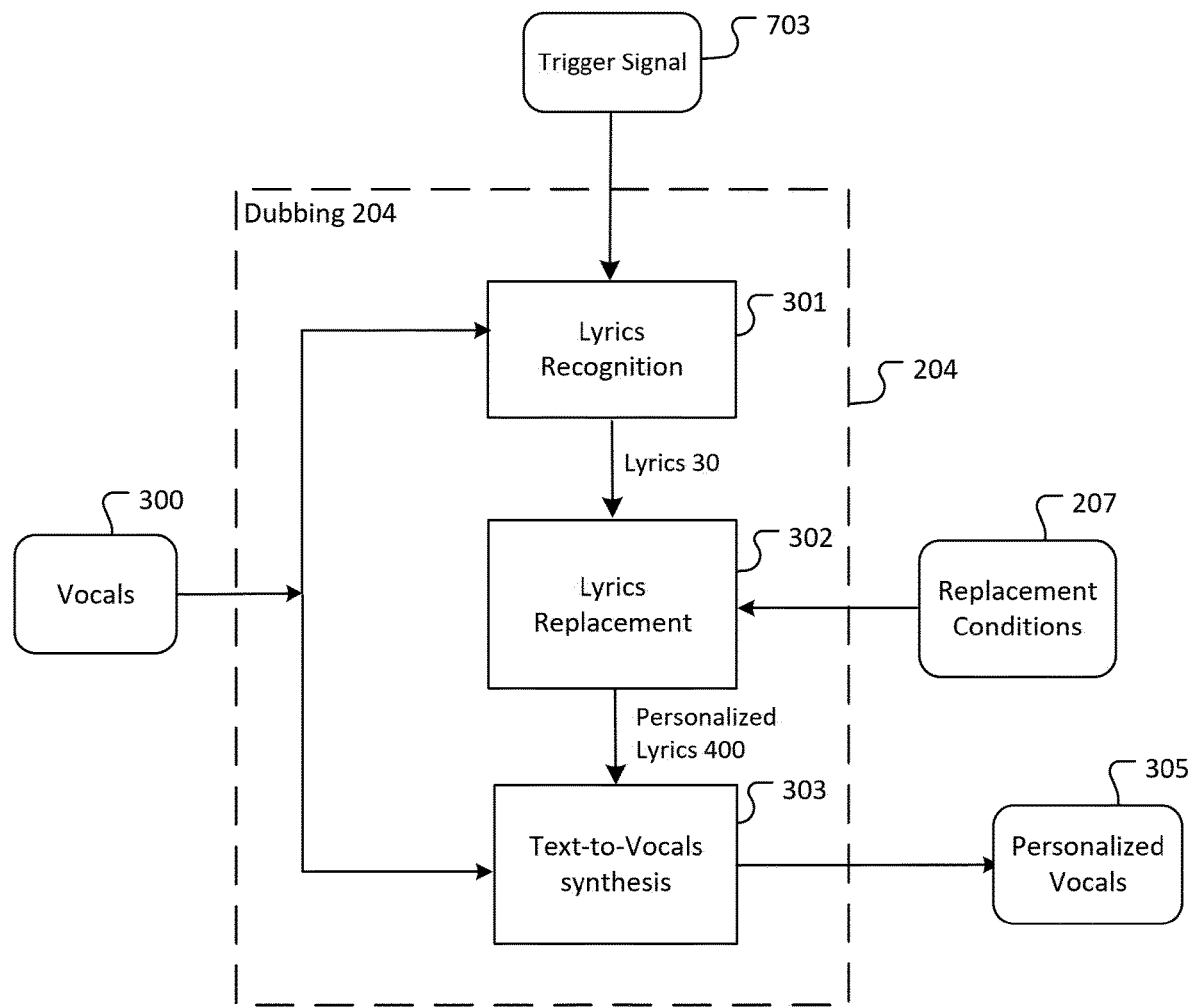
Figure 3B:
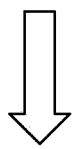
Figure 3C:
Figure 4:
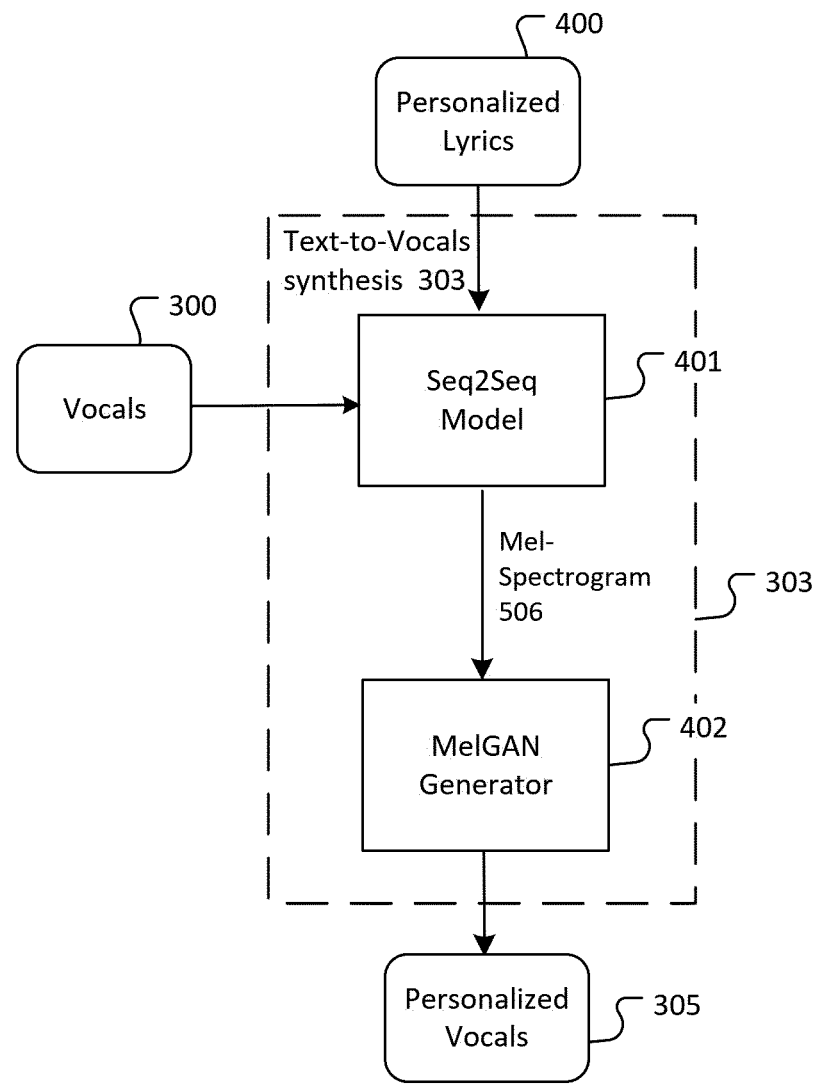
Figure 5:
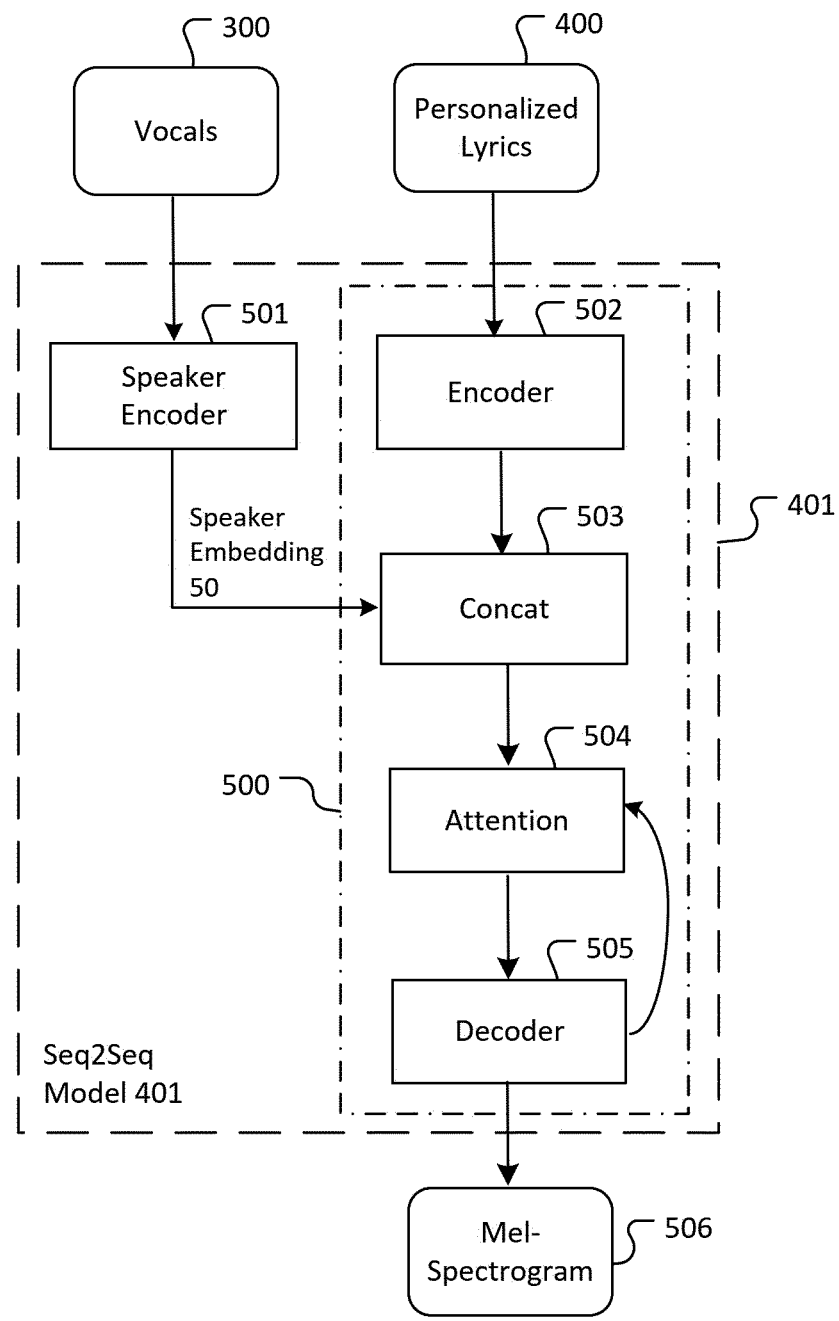
Figure 6:
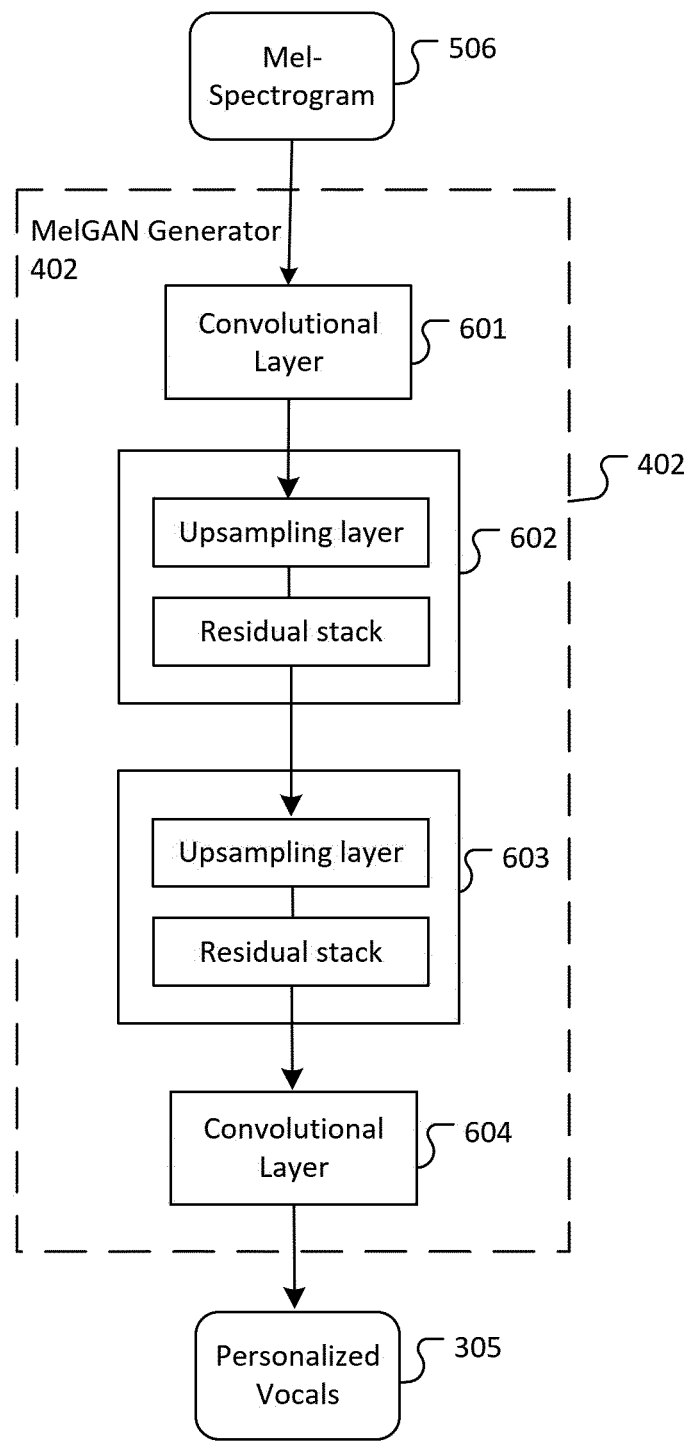
Figure 7:
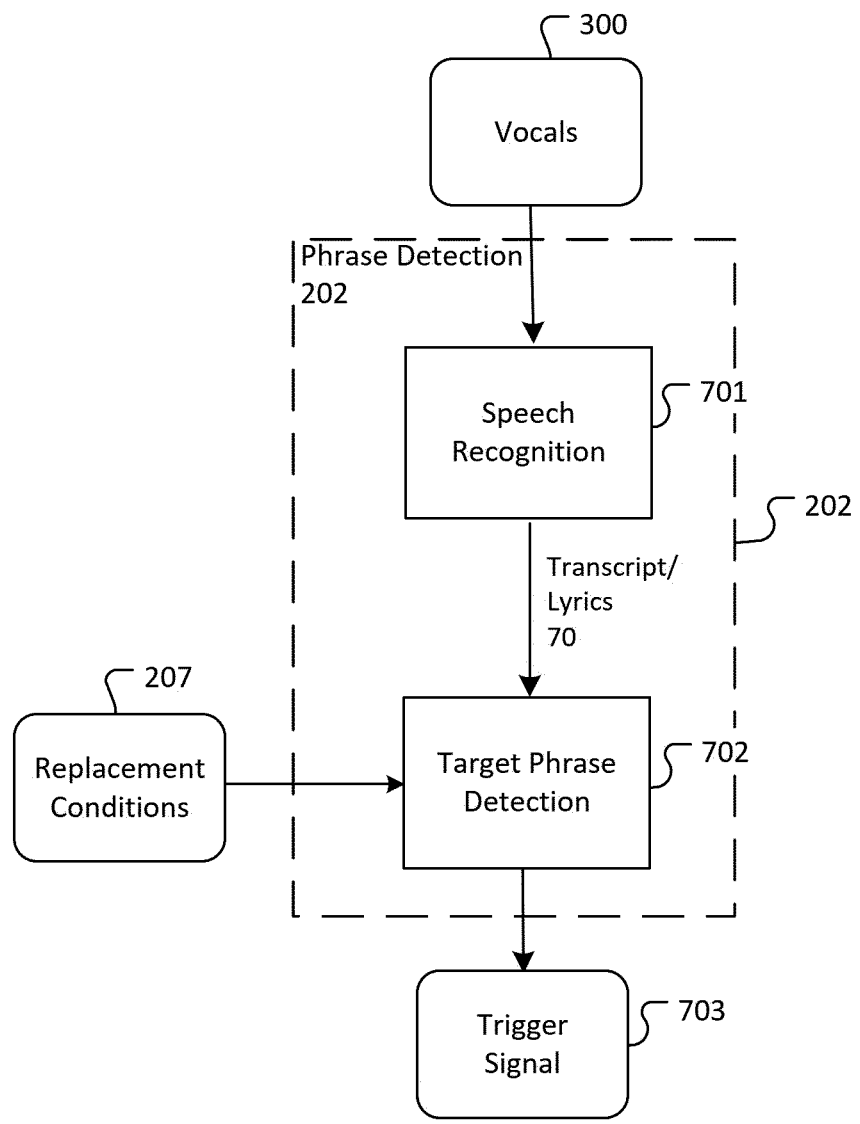
Figure 8:
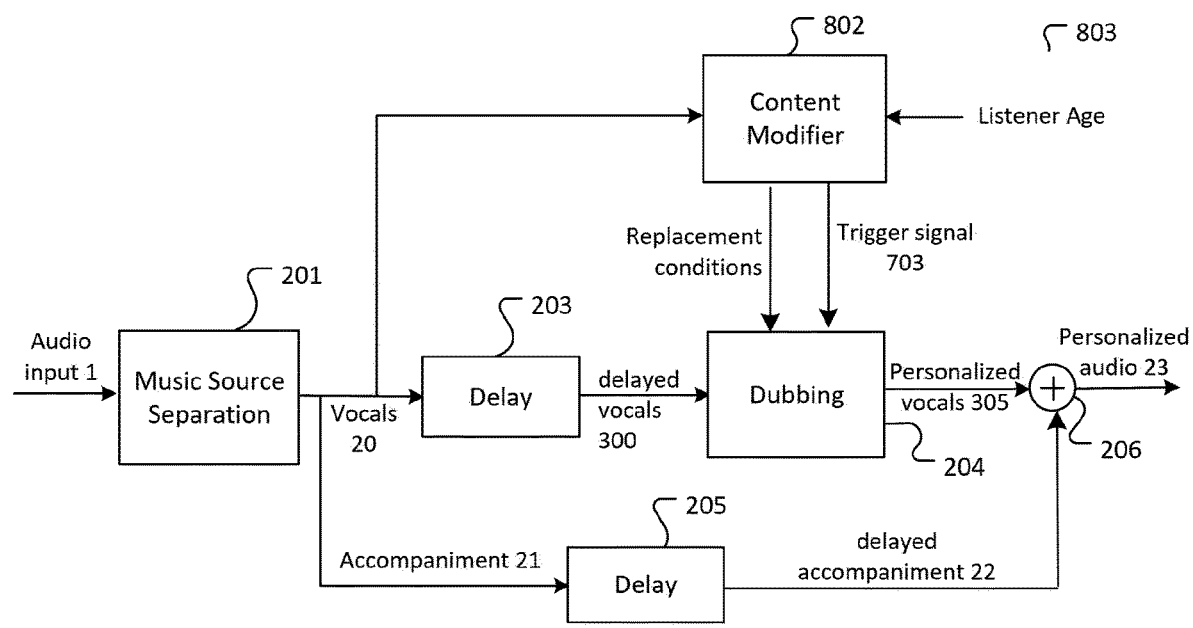
Figure 9:
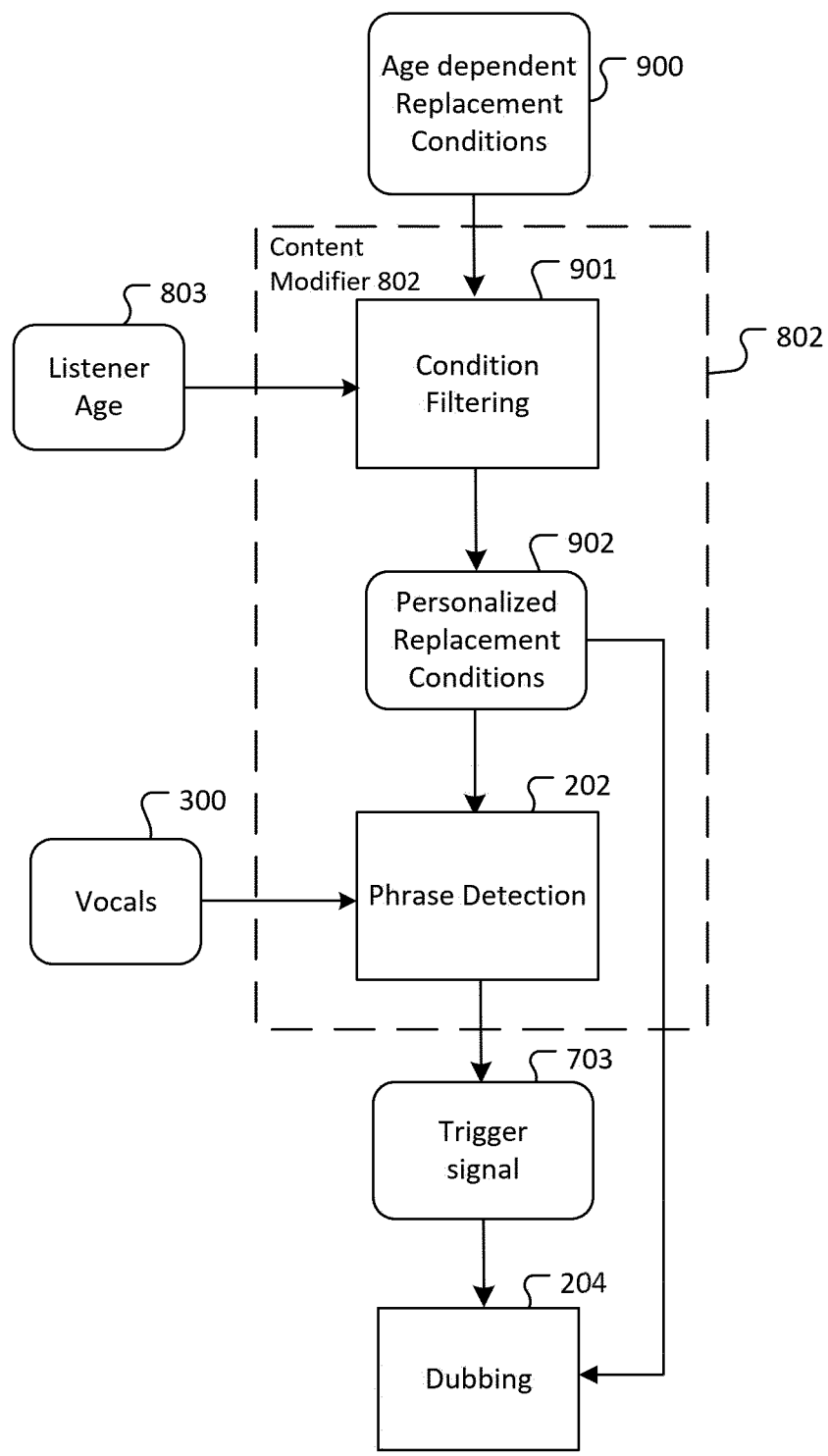
Figure 10:
Figure 11:
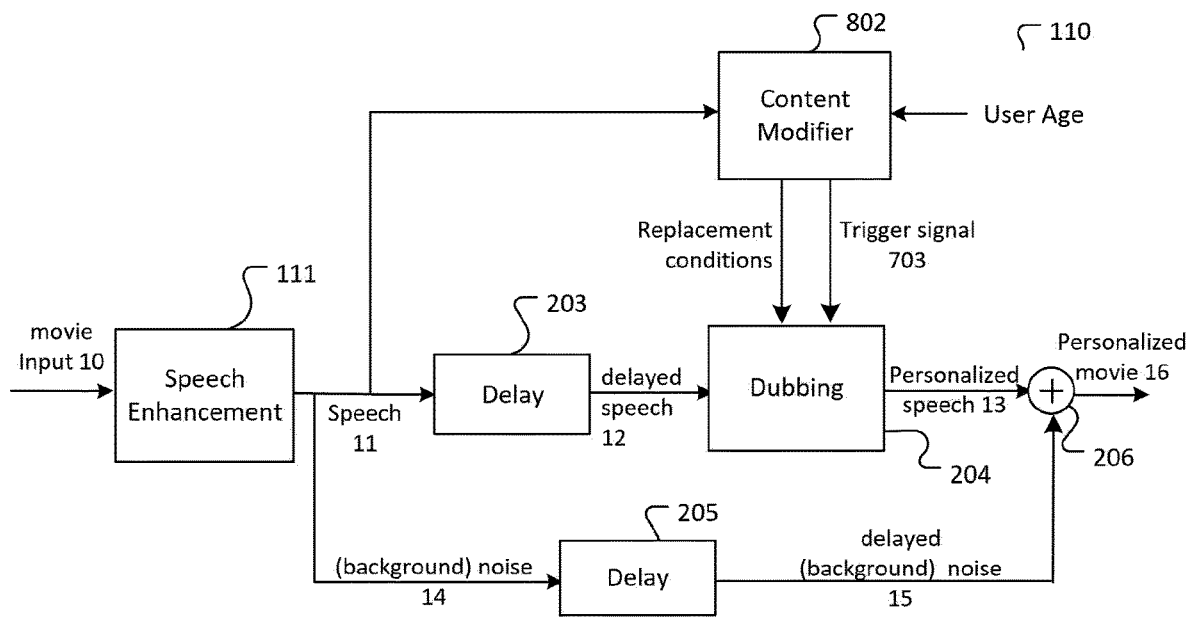
Figure 12:
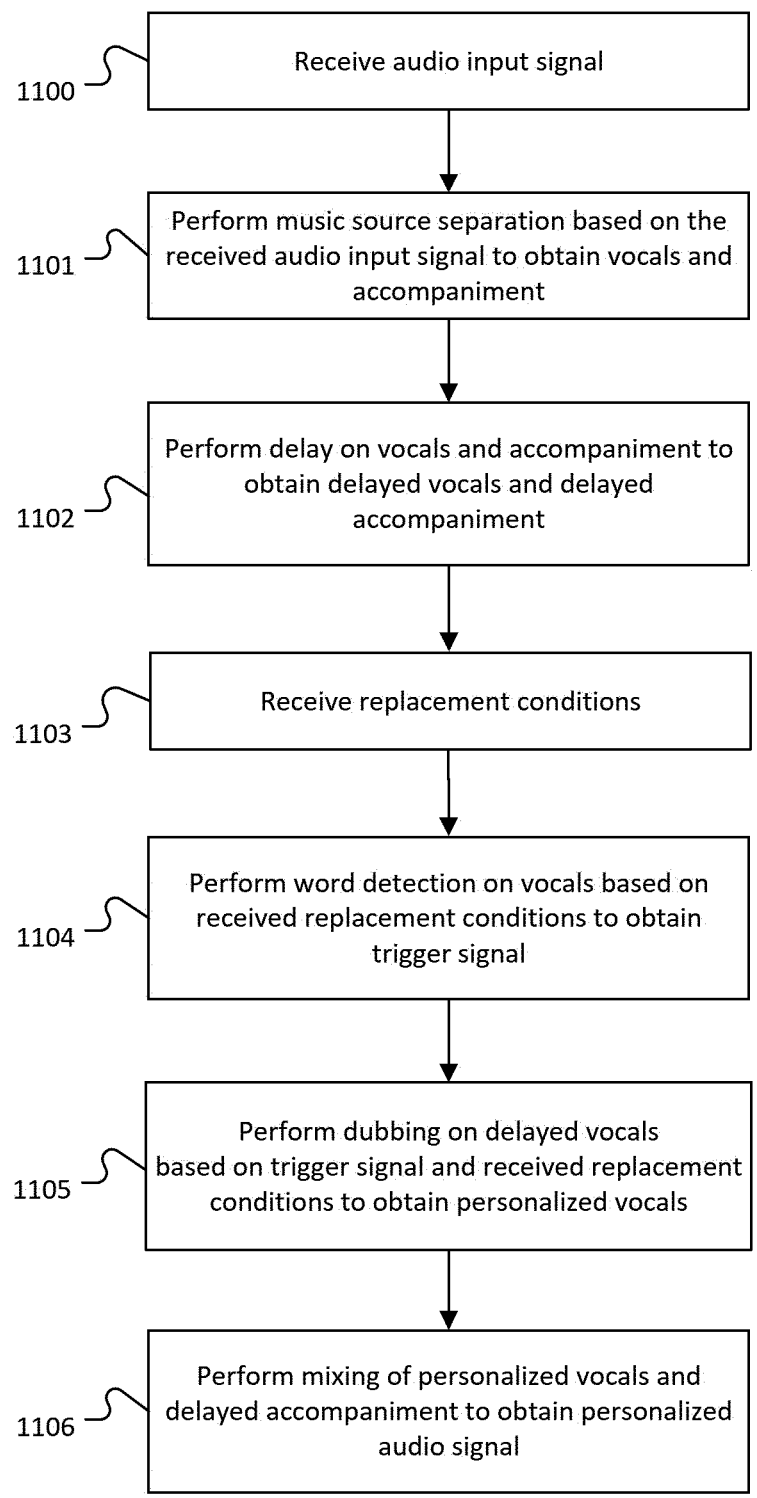
Figure 13:
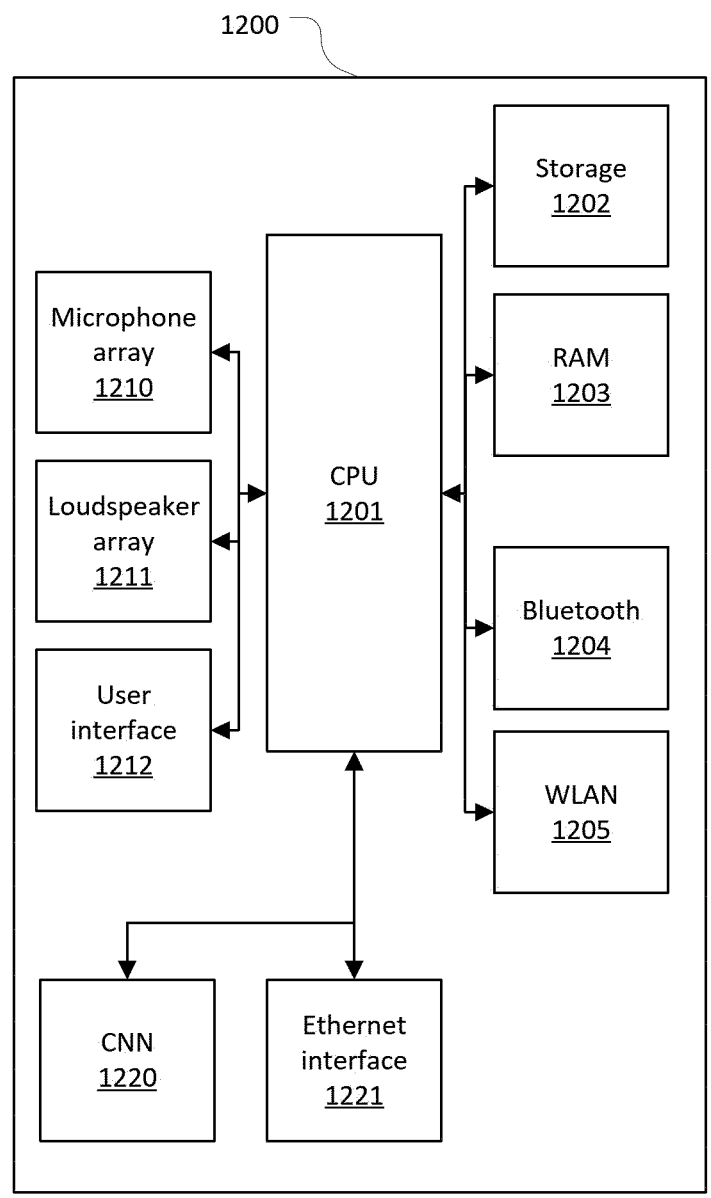

Embodiments are explained by way of example with respect to the accompanying drawings, in which:

FIG. 1 schematically shows a general approach of audio upmixing/remixing by means of blind source separation (BSS), such as music source separation (MSS);

FIG. 2 schematically shows a process of audio personalization based on audio source separation and dubbing;

FIG. 3a schematically describes in more detail an embodiment of the dubbing process performed in the process of audio personalization described in FIG. 2;

FIG. 3b schematically shows a replacement condition input performed in FIG. 3a;

FIG. 3c schematically shows a process of replacement condition selection performed in the process of dubbing described in FIG. 3a;

FIG. 4 schematically describes in more detail an embodiment of the Text-to-Vocals process performed in the process of dubbing described in FIG. 3a;

FIG. 5 schematically describes in more detail an embodiment of the Seq2Seq Model process performed in the process of Text-to-Vocals described in FIG. 4;

FIG. 6 schematically describes in more detail an embodiment of the MelGAN Generator process performed in the process of Text-to-Vocals described in FIG. 4;

FIG. 7 schematically describes in more detail an embodiment of the Phrase Detection process performed in the process of audio personalization described in FIG. 2;

FIG. 8 schematically shows another embodiment of a process of audio personalization based on music source separation and dubbing;

FIG. 9 schematically describes in more detail an embodiment of the Content Modifier process performed in the process of audio personalization described in FIG. 8;

FIG. 10 schematically shows a process of condition filtering performed in the Content Modifier 802 performed in the process of audio personalization described in FIG. 9;

FIG. 11 schematically shows a process of transcript personalization based on music source separation and dubbing;

FIG. 12 shows a flow diagram visualizing a method for signal mixing related to content personalization based on dubbing and music source separation to obtain a personalized content signal; and FIG. 13 schematically describes an embodiment of an electronic device that can implement the processes of content personalization based on dubbing and music source separation.

DETAILED DESCRIPTION OF EMBODIMENTS

Before a detailed description of the embodiments under reference of FIG. 1 to FIG. 13, some general explanations are made.

In the following, the terms remixing, upmixing, and downmixing can refer to the overall process of generating output audio content on the basis of separated audio source signals originating from mixed input audio content, while the term "mixing" can refer to the mixing of the separated audio source signals. Hence the "mixing" of the separated audio source signals can result in a "remixing", "upmixing" or "downmixing" of the mixed audio sources of the input audio content.

The embodiments disclose an electronic device comprising circuitry configured to perform audio source separation on an audio input signal to obtain a separated source and to perform audio dubbing on the separated source based on replacement conditions to obtain a personalized separated source.

The electronic device may for example be any music or movie reproduction device such as smartphones, Headphones, TV sets, Blu-ray players or the like.

The circuitry of the electronic device may include a processor, may for example be CPU, a memory (RAM, ROM or the like), a memory and/or storage, interfaces, etc. Circuitry may comprise or may be connected with input means (mouse, keyboard, camera, etc.), output means (display (e.g. liquid crystal, (organic) light emitting diode, etc.)), loudspeakers, etc., a (wireless) interface, etc., as it is generally known for electronic devices (computers, smartphones, etc.). Moreover, circuitry may comprise or may be connected with sensors for sensing still images or video image data (image sensor, camera sensor, video sensor, etc.), for sensing environmental parameters (e.g. radar, humidity, light, temperature), etc.

In audio source separation, an input signal comprising a number of sources (e.g. instruments, voices, or the like) is decomposed into separations. Audio source separation may be unsupervised (called "blind source separation", BSS) or partly supervised. "Blind" means that the blind source separation does not necessarily have information about the original sources. For example, it may not necessarily know how many sources the original signal contained or which sound information of the input signal belong to which original source. The aim of blind source separation is to decompose the original signal separations without knowing the separations before. A blind source separation unit may use any of the blind source separation techniques known to the skilled person. In (blind) source separation, source signals may be searched that are minimally correlated or maximally independent in a probabilistic or information-theoretic sense or on the basis of a non-negative matrix factorization structural constraints on the audio source signals can be found. Methods for performing (blind) source separation are known to the skilled person and are based on, for example, principal components analysis, singular value decomposition, (in)dependent component analysis, non-negative matrix factorization, artificial neural networks, etc.

Although some embodiments use blind source separation for generating the separated audio source signals, the present disclosure is not limited to embodiments where no further information is used for the separation of the audio source signals, but in some embodiments, further information is used for generation of separated audio source signals. Such further information can be, for example, information about the mixing process, information about the type of audio sources included in the input audio content, information about a spatial position of audio sources included in the input audio content, etc.

The input signal can be an audio signal of any type. It can be in the form of analog signals, digital signals, it can origin from a compact disk, digital video disk, or the like, it can be a data file, such as a wave file, mp3-file or the like, and the present disclosure is not limited to a specific format of the input audio content. An input audio content may for example be a stereo audio signal having a first channel input audio signal and a second channel input audio signal, without that the present disclosure is limited to input audio contents with two audio channels. In other embodiments, the input audio content may include any number of channels, such as remixing of an 5.1 audio signal or the like.

The input signal may comprise one or more source signals. In particular, the input signal may comprise several audio sources. An audio source can be any entity, which produces sound waves, for example, music instruments, voice, vocals, artificial generated sound, e.g. origin form a synthesizer, etc.

The input audio content may represent or include mixed audio sources, which means that the sound information is not separately available for all audio sources of the input audio content, but that the sound information for different audio sources, e.g. at least partially overlaps or is mixed.

The circuitry may be configured to perform the remixing or upmixing based on at least one filtered separated source and based on other separated sources obtained by the blind source separation to obtain the remixed or upmixed signal. The remixing or upmixing may be configured to perform remixing or upmixing of the separated sources, here "vocals" and "accompaniment" to produce a remixed or upmixed signal, which may be sent to the loudspeaker system. The remixing or upmixing may further be configured to perform lyrics replacement of one or more of the separated sources to produce a remixed or upmixed signal, which may be sent to one or more of the output channels of the loudspeaker system.

The circuitry of the electronic device may for example be configured to perform lyrics recognition on the separated source to obtain lyrics and to perform lyrics replacement on the lyrics based on the replacement conditions to obtain personalized lyrics.

The circuitry of the electronic device may for example be configured to perform a text-to-vocals synthesis on the personalized lyrics based on the separated source to obtain the personalized separated source.

The circuitry of the electronic device may for example be configured to apply a sequence-to-sequence model (Seq2Seq Model) on the personalized lyrics based on the separated source to obtain a Mel-Spectrogram, and to apply a generative model (e.g., MelGAN) on the Mel-Spectrogram to obtain the personalized separated source.

The circuitry of the electronic device may for example be configured to perform the source separation on the audio input signal to obtain the separated source and a residual signal, and to perform mixing of the personalized separated source with the residual signal, to obtain a personalized audio signal.

The circuitry of the electronic device may for example be configured to perform delay of the separated source to obtain a delayed separated source, and wherein the circuitry is further configured to perform a delaying of the residual signal to obtain a delayed separated source.

The circuitry of the electronic device may for example be configured to perform the audio dubbing on the separated source based on a trigger signal to obtain the personalized separated source.

The circuitry of the electronic device may for example be configured to perform phrase detection on the separated source based on the replacement conditions to obtain the trigger signal.

The circuitry of the electronic device may for example be configured to perform speech recognition on the separated source to obtain transcript/lyrics.

The circuitry of the electronic device may for example be further configured to perform target phrase detection on the transcript/lyrics based on the replacement conditions to obtain the trigger signal.

According to an embodiment, the separated source comprises vocals and the residual signal comprises an accompaniment.

According to an alternative embodiment, the separated source comprises speech and the residual signal comprises background noise.

The replacement conditions may be age dependent replacement conditions.

The embodiments also disclose a method comprising performing audio source separation on an audio input signal to obtain a separated source; and performing dubbing on the separated source based on replacement conditions to obtain a personalized separated source.

The embodiments also disclose a computer program comprising instructions, the instructions when executed on a processor causing the processor to perform the processes disclosed here.

Embodiments are now described by reference to the drawings.

Audio Remixing/Upmixing by Means of Audio Source Separation

FIG. 1 schematically shows a general approach of audio upmixing/remixing by means of blind source separation (BSS), such as music source separation (MSS).

First, source separation (also called "demixing") is performed which decomposes a source audio signal 1 comprising multiple channels I and audio from multiple audio sources Source 1, Source 2, . . . Source K (e.g. instruments, voice, etc.) into "separations", here into source estimates 2a-2d for each channel i, wherein K is an integer number and denotes the number of audio sources. In the embodiment here, the source audio signal 1 is a stereo signal having two channels i=1 and i=2. As the separation of the audio source signal may be imperfect, for example, due to the mixing of the audio sources, a residual signal 3 (r(n)) is generated in addition to the separated audio source signals 2a-2d. The residual signal may for example represent a difference between the input audio content and the sum of all separated audio source signals. The audio signal emitted by each audio source is represented in the input audio content 1 by its respective recorded sound waves. For input audio content having more than one audio channel, such as stereo or surround sound input audio content, also a spatial information for the audio sources is typically included or represented by the input audio content, e.g. by the proportion of the audio source signal included in the different audio channels. The separation of the input audio content 1 into separated audio source signals 2a-2d and a residual 3 is performed based on blind source separation or other techniques which are able to separate audio sources.

In a second step, the separations 2a-2d and the possible residual 3 are remixed and rendered to a new loudspeaker signal 4, here a signal comprising five channels 4a-4e, namely a 5.0 channel system. Based on the separated audio source signals and the residual signal, an output audio content is generated by mixing the separated audio source signals and the residual signal taking into account spatial information. The output audio content is exemplary illustrated and denoted with reference number 4 in FIG. 1.

In the following, the number of audio channels of the input audio content is referred to as $M_{in}$ and the number of audio channels of the output audio content is referred to as $M_{out}$. As the input audio content 1 in the example of FIG. 1 has two channels i=1 and i=2 and the output audio content 4 in the example of FIG. 1 has five channels 4a-4e, $M_{in}$=2 and $M_{out}$=5. The approach in FIG. 1 is generally referred to as remixing, and in particular as upmixing if $M_{in}$<$M_{out}$. In the example of the FIG. 1 the number of audio channels $M_{in}$=2 of the input audio content 1 is smaller than the number of audio channels $M_{out}$=5 of the output audio content 4, which is, thus, an upmixing from the stereo input audio content 1 to 5.0 surround sound output audio content 4.

Technical details about source separation process described in FIG. 1 above are known to the skilled person. An exemplifying technique for performing blind source separation is for example disclosed in European patent application EP 3 201 917, or by Uhlich, Stefan, et al. "Improving music source separation based on deep neural networks through data augmentation and network blending." 2017 IEEE International Conference on Acoustics, Speech and Signal Processing (ICASSP). IEEE, 2017. There also exist programming toolkits for performing blind source separation, such as Open-Unmix, DEMUCS, Spleeter, Asteriod, or the like which allow the skilled person to perform a source separation process as described in FIG. 1 above.

Personalization of Songs Based on Source Separation and Overdubbing

FIG. 2 schematically shows a process of audio personalization based on audio source separation and dubbing. The process allows to perform music personalization using source separation and dubbing by combining (online) audio source separation with audio dubbing.

An audio input signal (see 1 in FIG. 1) containing multiple sources (see 1, 2, . . . , K in FIG. 1), with, for example, multiple channels (e.g. =2) e.g. a piece of music, is input to Music Source Separation 201 and decomposed into separations (see separated sources 2a-2d and residual signal 3 in FIG. 1) as it is described with regard to FIG. 1 above. In the present embodiment, the audio input signal 1 is decomposed into one separated source 2, namely Vocals 20, and into a residual signal 3, namely Accompaniment 21, which includes the remaining sources of the audio input signal, apart from the Vocals 20. The Vocals 20, which can be a Vocals' audio waveform, are processed by a Phrase Detection 202 based on Replacement Conditions 207 to obtain a trigger signal 703. An embodiment of Phrase Detection process 202 is described in more detail with regard to FIG. 7 below. As the process of the Phrase Detection 202 requires computation effort that needs some processing time, the Dubbing 204 will receive the Trigger Signal 703 with some time lag. That is, there will be an expected latency, for example a time delay Δt, of the Trigger Signal 703. In order to compensate this time delay introduced by the Phrase Detection 202, the Vocals 20 generated by Music Source Separation 201 are delayed using a Delay 203 to obtain delayed Vocals 300. This expected time delay is a known, predefined parameter, which may be set in the Delay 203 as a predefined parameter. A process of Dubbing 204 is performed on the delayed Vocals 300 based on the trigger signal 703, obtained by the Phrase Detection 202, and based on the Replacement Conditions 207, to obtain personalized Vocals 305. An embodiment of the process of Dubbing 204 is described in more detail with regard to FIGS. 3a to 6 below.

Similarly, to the Delay 203, the Accompaniment 21 is delayed using a Delay 205 process to obtain delayed Accompaniment 22. At the Delay 205, the Accompaniment 21 is delayed by the expected combined latency due to the Phrase Detection 202 process and due to Dubbing 204 process, to obtain delayed Accompaniment 22. This has the effect that the latency is compensated by a respective delay of the Accompaniment. A mixer 206 mixes the personalized Vocals 305, obtained by the Dubbing 204, to the delayed Accompaniment 22, obtained by the Delay 205, to obtain a personalized audio signal 23.

It is to be noted that all the above described processes, namely the Music Source Separation 201, the Phrase Detection 202 and the Dubbing 204 can be performed in real-time, e.g. "online" with some latency. For example, they could be directly run on the smartphone of the user/in his headphones.

The Dubbing 204 process may for example be implemented as described in more detail in published paper Kumar, Kundan, et al. "Melgan: Generative adversarial networks for conditional waveform synthesis." Advances in Neural Information Processing Systems. 2019. This exemplary process of the Dubbing 204, including a Text-to-Vocals synthesis process 303 process having a Seq2Seq Model 401 process and a MelGAN Generator 402 process is described in more detail with regard to FIGS. 3a to 6 below. An exemplary process of the Dubbing 204, including the Text-to-Vocals synthesis process 303, is described in more detail with regard to FIG. 3a below.

Using the process of FIG. 2, it is possible to for example alter the lyrics in a song (as described in FIGS. 3a and 8 below) or dialogs in a movie (as described in FIG. 11), i.e., to personalize them.

FIG. 3a schematically describes in more detail an embodiment of the dubbing process performed in the process of audio personalization described in FIG. 2 above, in which the dubbing is performed on the delayed Vocals in order to obtain personalized Vocals.

In this embodiment of FIG. 3a, a process of Dubbing 204 is performed on delayed Vocals, here Vocals 300, based on a trigger signal 703 obtained by the Phrase Detection 202, in order to obtain personalized Vocals 305. A Lyrics Recognition 301 process is performed on the separated source 20, here on the Vocals 300, based on the trigger signal 703, to obtain lyrics 30 of the Vocals 300. Based on the Replacement Conditions 207, a Lyrics Replacement 302 process is performed on the lyrics 30 to obtain personalized lyrics 400. Based on the Vocals 300, a Text-to-Vocals synthesis 303 is performed on the personalized lyrics 400 to obtain personalized Vocals 305. The personalized Vocals 305 can be a Vocals' raw waveform. An embodiment of this process of Text-to-Vocals synthesis 303 is described in more detail with regard to FIG. 4 below.

The Lyrics Recognition 301 may be implemented by any technique such as automatic speech recognition (ASR), computer speech recognition or speech to text (STT). For example, Hidden Markov models, Dynamic time warping (DTW)-based speech recognition, Neural networks such as Deep feedforward and recurrent neural networks may be used.

The Lyrics Replacement 302 allows to personalize music (e.g., to replace names in lyrics/dialogs) or to replace explicit language with a kids-friendly version. In this way, it is possible to modify music in order to personalize the lyrics. Such a feature can for example be used in order to create personalized love songs, where the name of the loved person is inserted for the original name in the song. For example, the Replacement Conditions 207 may instruct the Lyrics Replacement 302 to replace "Angie" by "Tara" in the lyrics 30. Still further, many songs have a parental guidance label as they contain explicit language. Hence, such songs cannot be listened to by children. Using the process of FIG. 3a, it is possible to replace explicit language with kids-friendly version. The Personalized Lyrics 400 output by Lyrics Replacement 302 may for example be a sequence of grapheme or phoneme.

FIG. 3b schematically shows a replacement condition input performed in FIG. 3a. The Lyrics Replacement 302 (see FIG. 3a) allows to personalize music (e.g., to replace names in lyrics/dialogs), by modifying the lyrics of a song in order to personalize the lyrics.

A user, who listens to a song, wants to replace a name, here the name "Angie", which is included in the Lyrics 30 of the song with the name of his preference, here the name "Tara". The Replacement Conditions 207 is the replacement condition "Replace "Angie" by "Tara"", which instructs the Lyrics Replacement 302 to replace the name "Angie" by "Tara" in the Lyrics 30. Such a feature can for example be used in order to create personalized love songs, where the name of the loved person is inserted for the original name in the song.

FIG. 3c schematically shows a process of replacement condition selection performed in the process of dubbing described in FIG. 3a. Many songs have a parental guidance label as they contain explicit language, and thus such songs cannot be listened to by children. In such cases replacement of the explicit language with a kids-friendly version can be performed.

A condition selection process, displayed as the arrow between the upper part and lower part of FIG. 3c, selects the replacement conditions, stored in a database, based on the lyrics of a song listened by a user, to obtain desirable replacement conditions. The upper part of FIG. 3c schematically shows a table in which an expression, such as in this embodiment Phrase 1, namely "cut the head", is formulated differently, by removing explicit language. For example, Phrase 1 is an expression that contains explicit language and should be read/heard only but by adults. As shown in FIG. 3c, there are three different expressions, namely "cut the head", "cursed", "killed", without limiting the present disclosure in that regard. The expression may be any desirable expression. Based on the expression contained in the Lyrics 30, a replacement condition, such as for example "Replace "Phrase 1" by "Phrase 2"", is applicable. In this embodiment, based on the Lyrics 30, Phrase 1 "cut the head" can be replaced by Phrase 2 "fatally injured", Phrase 1 "cursed" can be replaced by Phrase 2 "fought", and Phrase 1 "killed" can be replaced by Phrase 2 "wounded".

The lower part of FIG. 3c schematically shows the replacement condition obtained from the condition selection process described above. In the embodiment of FIG. 3c, the obtained replacement condition is "Replace "cut the head" by "fatally injured"", based on the Lyrics 30.

The Lyrics Replacement 302 can for example be implemented as a regular expression (regexp) processor and the Replacement Conditions 207 may for example be realized as regular expression (regexp) patterns. A regexp processor translates a regular expression into an internal representation which can be executed and matched against a string representing the text being searched. A regular expression is a sequence of characters that defines a search pattern and which describes regular languages in formal language theory. A regex pattern may be used by string searching algorithms for "find" or "find and replace" operations on strings, or for input validation, and which matches a target string. For example, wildcards which match any character may be used to construct the Replacement Conditions. For example, the regular expression/([a-z])*)\scut\s([a-z])*) 's\shead/with the substitution/$1 fatally injured $2/would translate the text string "conan came into the room. he found hulk. conan cut hulk's head." into "conan came into the room. he found hulk. conan fatally injured hulk.".

FIG. 4 schematically describes in more detail an embodiment of the Text-to-Vocals synthesis process performed in the process of Dubbing described in FIG. 3a above, in which the Text-to-Vocals synthesis is performed on the delayed Vocals based on the personalized lyrics (see FIG. 3a) in order to obtain personalized Vocals. A Seq2Seq Model 401 process is applied on the delayed Vocals, here Vocals 300, based on the Personalized Lyrics 400 to obtain a Mel spectrogram 506 of the Vocals. An embodiment of this process of Seq2Seq Model 401 is described in more detail with regard to FIG. 5 below. Subsequently, a MelGAN Generator 402 process is performed on the Mel spectrogram 506 of the Vocals 300 to obtain personalized Vocals 305. The Personalized Vocals 305 can be a Vocals' raw waveform. An embodiment of this process of MelGAN Generator 402 is described in more detail with regard to FIG. 6 below.

In the embodiment described in FIG. 4 above, the Text-to-Vocals synthesis 303 creates a Mel spectrogram 506 based on the personalized lyrics 400 and on the separated source 20, here Vocals 300, and then, the Mel spectrogram 506 is converted into personalized vocals 305, which can be inserted back to the music, by mixing the personalized vocals 305 with the delayed Accompaniment 22 (see FIG. 2).

FIG. 5 schematically describes in more detail an embodiment of the Seq2Seq Model process 401 performed in the process of Text-to-Vocals synthesis 303 described in FIG. 4 above, in which the Seq2Seq Model is applied on the delayed Vocals based on the personalized lyrics (see 400 in FIG. 4) in order to obtain a Mel-Spectrogram. This Seq2Seq Model 401 may for example be implemented as a recurrent sequence-to-sequence feature prediction network that maps character embeddings to Mel-Spectrograms. The Personalized Lyrics 400 input to the Seq2Seq Model process 401 may for example be a sequence of grapheme or phoneme being input to the Synthesizer 500 and the Vocals 300 are used as a speaker's reference waveform in the Text-to-Vocals synthesis 303 process.

The Vocals 300 are processed by a Speaker Encoder 501 to obtain a Speaker Embedding 50, which is a fixed dimensional vector computed from a speech signal such as here the Vocals 300. The Speaker Encoder 501 may for example be implemented by a neural network which is trained to generate, from the Vocals 300 the personalized vocals (see 305 in FIGS. 3a and 4 as described in published paper Shen, Jonathan, et al. "Natural TTS synthesis by conditioning WaveNet on Mel-Spectrogram predictions." 2018 IEEE International Conference on Acoustics, Speech and Signal Processing (ICASSP). IEEE, 2018, or Prenger, Ryan, Rafael Valle, and Bryan Catanzaro. "WaveGlow: A flow-based generative network for speech synthesis." ICASSP 2019-2019 IEEE International Conference on Acoustics, Speech and Signal Processing (ICASSP). IEEE, 2019. The Vocals 300 act as a speaker's reference waveform which is audio data of a target TTS speaker which is mapped by the Speaker Encoder 502 to a fixed length vector, e.g. the speaker embedding vector, that describes the speaker characteristics e.g. male, female, etc.

Based on the Personalized Lyrics 400 and the Speaker Embedding 50 obtained by the Speaker Encoder 501, a process of a sequence-to-sequence synthesizer, such as a Synthesizer 500, is performed to obtain a Mel-Spectrogram 506 of the Personalized Lyrics 400. In particular, the Personalized Lyrics 400 are input to an Encoder 502 of the Synthesizer 500. The Personalized Lyrics 400 are encoded by the Encoder 502 to obtain a personalized lyrics embedding vector. The encoded personalized lyrics embedding vector are concatenated with the speaker embedding vector obtained by the Speaker Encoder 501 at each time step. The concatenated personalized lyrics are passed to an Attention 504 layer of the Synthesizer 500, which is implemented on the basis of an encoder-decoder architecture with attention, such as the Encoder 502, the Decoder 505 and the Attention 504 of the Synthesizer 500. The encoder-decoder architecture with attention of the Synthesizer 500 of FIG. 5 may for example be implemented as described in the above cited reference Shen, Jonathan, et al. The encoder may for example convert a character sequence into a hidden feature representation which the decoder consumes to predict a spectrogram. Input characters may for example be represented using a learned 512-dimensional character embedding, which are passed through a stack of three convolutional layers, to generate the encoded features. The encoder output is consumed by an attention network which summarizes the full encoded sequence as a fixed-length context vector for each decoder output step. The decoder is an autoregressive recurrent neural network which predicts a Mel-Spectrogram from the encoded input sequence one frame at a time. In this way, a Mel-Spectrogram 506 is generated by the Encoder 502-Decoder 505 architecture with Attention 504. This Mel-Spectrogram 506 is conditioned on the speaker embedding vector 50 which characterizes the Vocals 300. That is, the Speaker Encoder 502 is used to condition the Synthesizer 500 on a reference speech signal, here the Vocals 300, of the desired target speaker.

As described in the embodiment of FIG. 5, a mechanism of attention (see 502, 504, 505 in FIG. 5) in the Synthesizer 500 is implemented. The Decoder 505 decides parts of a source sentence, here the Personalized Lyrics 400, to pay attention to. By letting the Decoder 505 to have an Attention 504 mechanism, the Encoder 502 is relieved from the burden of having to encode all information in the source sentence into a fixed length vector. Therefore, the information can be spread throughout the sequence of annotations, which can be selectively retrieved by the Decoder 505 accordingly.

In the embodiment of FIG. 5, in order to create the voice of a specific person, e.g. the vocals of a specific singer, conditioning of the Seq2Seq Model 401 that creates the Mel-Spectrogram 506, may alternatively be performed, as described in published paper Jia, Ye, et al. "Transfer learning from speaker verification to multispeaker text-to-speech synthesis.", Advances in neural information processing systems, 2018.

It should also be noted that the Speaker Encoder 502 and the Synthesizer 500 can be two independently trained neural networks. However, the present invention is not limited to this example. The Speaker Encoder 502 and the Synthesizer 500 can also be one trained neural network.

FIG. 6 schematically describes in more detail an embodiment of the MelGAN Generator process 402 in the process of Text-to-Vocals synthesis 303 described in FIG. 4 above. The MelGAN Generator 403 is applied on the Mel-Spectrogram 506 obtained by the Seq2Seq Model 401 in order to obtain personalized Vocals.

The Mel-Spectrogram 506 is filtered by a Convolutional Layer 601 to obtain a sequence of activations, e.g. a feature map. A stack of transposed convolutional layers (see 602 and 603 in FIG. 6) up-samples the input sequence of activations. In particular, each transposed convolutional layer (see 602 and 603 in FIG. 6) includes an Upsampling Layer, which is followed by a stack of residual blocks with dilated convolutions. The transposed convolutional layer 603 outputs an output sequence of activations which is filtered by the Convolutional Layer 604 to obtain Personalized Vocals 305.

The MelGAN Generator process described above may for example be implemented based on the MelGAN Generator process described in the published paper Kumar, Kundan, et al. "MelGAN: Generative adversarial networks for conditional waveform synthesis." Advances in Neural Information Processing Systems. 2019. In this example, the MelGAN generator is implemented as a fully convolutional feed-forward network with Mel-spectrogram as input and raw waveform as output. Since the Mel-spectrogram is at a 256× lower temporal resolution, a stack of transposed convolutional layers is used to upsample the input sequence. Each transposed convolutional layer is followed by a stack of residual blocks with dilated convolutions. Residual blocks with dilations are added after each up sampling layer, so that temporally far output activations of each subsequent layer have significant overlapping inputs. The receptive field of a stack of dilated convolution layers increases exponentially with the number of layers. However, in the case of audio generation instance normalization may wash away important pitch information, making the audio sound metallic. Therefore, weight normalization is used in all layers of the generator.

FIG. 7 schematically describes in more detail an embodiment of the Phrase Detection process 202 performed in the process of audio personalization described in FIG. 2 above. The Phrase Detection 202 is performed on Vocals 300 based on Replacement Conditions 207 in order to obtain a trigger signal 703. In particular, a process of Speech Recognition 701 is performed on the Vocals 300 in order to convert the Vocals 300 into text and thus, to obtain transcript/lyrics 70 e.g. a sequence of words. Based on the Replacement Conditions 207, a process of Target Phrase Detection 702 is performed on the Transcript/Lyrics 70 to obtain a Trigger signal 703. In other words, based on the Replacement Conditions 207, a target word/phrase is detected on the Transcript/Lyrics 70.

Subsequently, the Trigger signal 703 triggers the Dubbing 204 (see FIG. 3a) to replace, in the Vocals 300, the target word, such as for example "Name A", with another predetermined word, such as for example "Name B", using a singer's audio characteristics.

The Target Phrase Detection 702 may perform a regexp matching and, in case that the regexp pattern matches, a trigger signal 703 is created. That is, the Target Phrase Detection 702 can for example be implemented, as described with regard to FIG. 3c, as a regular expression processor and the Replacement Conditions 207 may for example be realized as regular expression patterns.

It should also be noted that in the case the Replacement Conditions 207 are implemented as regular expressions, it is not necessary that the regexp matching happens both in the Target Phrase Detection 702 and in the Lyrics Replacement 302. According to an alternative embodiment, a regexp matching may be performed only in the Target Phrase Detection 702 and the Lyrics Replacement 302 implements the substitution part. In still other embodiments, the functionality of the Lyrics Replacement 302 and Target Phrase Detection 702 can be performed in a single functional unit. In this case, for example a successful regexp matching may trigger a respective substitution.

In the embodiment of FIG. 7, a Phrase Detection 202 process is performed to detect a target word or a target phrase on the Transcript/Lyrics 70, without limiting the present embodiment in that regard. The Phrase Detection 202 process can be performed to detect a target content, which can be any kind of text content, such as a word, a sequence of words e.g. a phrase, or the like.

Personalization of Music to Remove Explicit Content

FIG. 8 schematically shows another embodiment of a process of audio personalization based on music source separation and dubbing. An audio input signal containing multiple sources (see separated source 2 and residual signal 3 in FIG. 1) as it is described with regard to FIG. 1 above, here into a separated source 2, namely "Vocals" 20, and a residual signal 3, namely "Accompaniment" 21. The Vocals 20, which can be a Vocals' audio waveform, are processed by a Content Modifier 802 to obtain a trigger signal 703 and replacement conditions related to an age of a listener. An embodiment of this process of Content Modifier 802 is described in more detail with regard to FIG. 9 below. Based on the replacement conditions, the trigger signal 703 triggers a process of Dubbing 204 to be performed, such as replace "Phrase A" by "Phrase B" in the Vocals audio waveform, using singer's audio characteristics. Simultaneously with the Content Modifier 802, the Vocals 20 are delayed using a Delay 203 process to obtain delayed Vocals 300. The process of Dubbing 204 is performed on the delayed Vocals 300 based on the trigger signal 703 and the replacement conditions, obtained by the Content Modifier 802, to obtain personalized Vocals 305. An embodiment of this process of Dubbing 204 is described in more detail with regard to FIGS. 3a to 6 above. As the process of the Content Modifier 802 needs some time, the Dubbing 204 will detect the Vocals 20 later than it really is. That is, there is an expected latency, for example a time delay $\Delta t$, of the Vocals 20. The expected time delay is a known, predefined parameter, which may be set in the Delay 203 as a predefined parameter.

At the Delay 203, the Vocals are delayed by the expected latency, due to the Content Modifier 802 process, to obtain the delayed Vocals 300. This has the effect that the latency, due to the Content Modifier 802 process, is compensated by a respective delay of the Vocals 20. Simultaneously with the Delay 203, the Accompaniment 21 is delayed using a Delay 205 process to obtain delayed Accompaniment 22. At the Delay 205, the Accompaniment 21 is delayed by the expected latency, due to the Content Modifier 802 process and due to Dubbing 204 process, to obtain delayed Accompaniment 22. This has the effect that the latency is compensated by a respective delay of the Accompaniment 21. A mixer 206 mixes the separated source 20, here the personalized Vocals 300, obtained by the Dubbing 204, to the delayed Accompaniment 22, obtained by the Delay 205, to obtain a personalized audio signal 23.

The Dubbing 204 process may for example be implemented as described in more detail in published paper Kumar, Kundan, et al. "MelGAN: Generative adversarial networks for conditional waveform synthesis." Advances in Neural Information Processing Systems. 2019. It is to be noted that all the above described processes, namely the Music Source Separation 201, the Content Modifier 802 and the Dubbing 204 can be performed in real-time, e.g. "online".

FIG. 9 schematically describes in more detail an embodiment of the Content Modifier process performed in the process of audio personalization described in FIG. 8 above, in which the Content Modifier performs on the Vocals based on the listener Age in order to obtain Personalized Replacement Conditions and a Trigger signal. A Condition Filtering 901 process is performed based on the listener Age 803 and based on Age dependent Replacement Conditions 900 being stored in a database, to obtain Personalized Replacement Conditions 902. An embodiment of the Condition Filtering 901 process is described in more detail with regard to FIG. 10 below. Based on the Personalized Replacement Conditions 902, a Phrase Detection 202 process is performed on Vocals 300 obtained by Music Source Separation 201 (see FIG. 8), to obtain a Trigger signal 703. An embodiment of the Phrase Detection 202 process is described in more detail with regard to FIG. 7 above. Subsequently, a Dubbing 204 process is performed based on the Trigger signal 703 and the Personalized Replacement Conditions 902. An embodiment of the Dubbing 204 process is described in more detail with regard to FIGS. 3a to 6 above.

The Personalized Replacement Conditions 902 are conditions related to replacement of explicit language, in the Vocals 300, with a predetermined language, such as for example a kids-friendly version of the vocals, or the like. In addition, the Personalized Replacement Conditions 902 are conditions related to the age of the audio's listener, such as for example conditions that require the replacement of a phrase with another predetermined phrase, which is a kids-friendly phrase, in a case where the listener is below a certain age, for example "Replace "Konan cut the head of his opponent" by "Konan wounded his enemy"", that is, an adults' phrase is replaced by a kids-friendly version, or the like. Therefore, the Trigger Signal 703 triggers the Dubbing 204 to replace, based on the Personalized Replacement Conditions 903, e.g. "Replace "Phrase 1" by "Phrase 2"", a target content, such as for example Phrase 1 "Konan cut the head of his opponent", with another predetermined content, such as for example Phrase 2 "Konan fatally injured his opponent". The target content, here Phrase 1, can be any kind of text content, such as a word, a sequence of words e.g. a phrase, or the like.

FIG. 10 schematically shows a process of condition filtering performed in the Content Modifier 802 performed in the process of audio personalization described in FIG. 9 above, in which the condition filter is performed on the lyrics based on listener's age and on replacement conditions in order to obtain personalized replacement conditions. A condition filtering (see 901 in FIG. 9) process, displayed as the arrow between the upper part and the lower part of FIG. 10, filters age dependent replacement conditions (see 900 in FIG. 9), stored in a database, based on the age of the listener (see 803 in FIG. 9), to obtain a personalized replacement conditions (see 902 in FIG. 9). The upper part of FIG. 10 schematically shows a table in which a phrase, such as in this embodiment Phrase 1, namely "Konan cut the head of his opponent", is formulated differently, by removing explicit language, based on an age group of a listener. For example, Phrase 1 is a phrase that contains explicit language and should be read/heard only but adults. As shown in FIG. 10, there are three different age groups, namely an age group above 18 years old and 15 years old, an age group between 15 years old and 9 years old and an age group below 9 years old, without limiting the present disclosure in that regard. The age group may be any desirable age group. Based on the age group of the listener, a replacement condition, such as for example "Replace "Phrase 1" by "Phrase 2"", is applicable, the replacement condition being different between the age groups. In this embodiment, based on the age group between 18 years old and 15 years old, Phrase 1 "Konan cut the head of his opponent" can be replaced by Phrase 2 "Konan fatally injured his opponent", based on the age group between 15 years old and 9 years old, Phrase 1 "Konan cut the head of his opponent" can be replaced by Phrase 2 "Konan fought with his opponent", and based on the age group below 9 years old, Phrase 1 "Konan cut the head of his opponent" can be replaced by Phrase 2 "Konan wounded his enemy".

The lower part of FIG. 10 schematically shows the personalized replacement condition (see 902 in FIG. 9) obtained from the condition filtering (see 901 in FIG. 9) process described above. In the embodiment of FIG. 10, the obtained personalized replacement condition is "Replace "Konan cut the head of his opponent" by "Konan fought with his opponent"", based on the listener's age group, here age group between 15 years old and 9 years old.

In the embodiment of FIG. 10, the personalized replacement condition obtained based on the age group between 15 years old and 9 years old, is described above, without limiting the present disclosure in that regard. The personalized replacement condition can be obtained based on any suitable age and/or age group. In addition, the age group described with regard to FIG. 10 does not limit the present disclosure in that regard, the age group may be any desirable age group.

Personalization of Movies to Remove Explicit Content

FIG. 11 schematically shows a process of transcript personalization based on speech enhancement and dubbing. An movie audio input signal containing multiple sources (see 1, 2, . . . , K in FIG. 1), e.g. a piece of music, is input to the Speech Enhancement 111 and decomposed into separations (see separated source 2 and residual signal 3 in FIG. 1) as it is described with regard to FIG. 1 above, here into a separated source 2, namely "speech" 11, and a residual signal 3, namely "background noise" 14. The speech 11 is processed by a Content Modifier 802 to obtain a trigger signal 703 and replacement conditions related to an age of a user. Based on the replacement conditions, the trigger signal 703 triggers a process of Dubbing 204 to be performed, such as replace "Phrase A" by "Phrase B" using speaker's voice characteristics. Simultaneously with the Content Modifier 802, the speech 11 is delayed using a Delay 203 process to obtain delayed speech 12. The process of Dubbing 204 is performed on the delayed speech 12 based on the trigger signal 703 and on the replacement conditions, obtained by the Content Modifier 802, to obtain personalized speech 13. An embodiment of this process of Dubbing 204 is described in more detail with regard to FIGS. 3a to 6 above. As the process of the Content Modifier 802 needs some time, the Dubbing 204 will detect the speech 11 later than it really is. That is, there is an expected latency, for example a time delay Δt, of the speech 11. The expected time delay is a known, predefined parameter, which may be set in the Delay 203 as a predefined parameter.

At the Delay 203, the speech 11 is delayed by the expected latency, due to the Content Modifier 802 process, to obtain the delayed speech 12. This has the effect that the latency, due to the Content Modifier 802 process, is compensated by a respective delay of the speech 11. Simultaneously with the Delay 203, the background noise 14 is delayed using a Delay 205 process to obtain delayed background noise 15. At the Delay 205, the background noise 14 is delayed by the expected latency, due to the Content Modifier 802 process and due to Dubbing 204 process, to obtain delayed background noise 15. This has the effect that the latency is compensated by a respective delay of the background noise 14. A mixer 206 mixes the personalized speech 13, obtained by the Dubbing 204, to the delayed background noise 15, obtained by the Delay 205, to obtain a personalized movie audio 16.

In the embodiment of FIG. 11, a Speech Enhancement 111 is performed on the movie audio input signal to obtain a speech 11 and a background noise 14. The Speech Enhancement 111 process of FIG. 11 has the same network architecture as the Music Source Separation 201 process performed in FIG. 1, however, their networks are trained on a different dataset. For example, the training material for the Speech Enhancement 111 process in FIG. 11 contains speech and noise samples.

The Dubbing 204 process may for example be implemented as described in more detail in published paper Kumar, Kundan, et al. "MelGAN: Generative adversarial networks for conditional waveform synthesis." Advances in Neural Information Processing Systems. 2019. It is to be noted that all the above described processes, namely the Music Source Separation 201, the Content Modifier 802 and the Dubbing 204 can be performed in real-time, e.g. "online".

Method and Implementation

FIG. 12 shows a flow diagram visualizing a method for signal mixing related to content personalization based on dubbing and music source separation to obtain a personalized content signal. At 1100, the music source separation (see 201 FIGS. 2, 8 and 10) receives an audio input signal (see stereo file 1 in FIG. 1). At 1101, music source separation (see 201 FIGS. 2, 8 and 11) is performed based on the received audio input signal to obtain vocals and accompaniment (see FIGS. 2, 8 and 10). At 1102, delay is performed on vocals and accompaniment to obtain delayed vocals and delayed accompaniment (see 203, 205 FIGS. 2, 8 and 11). At 1103, replacement conditions are received by the phrase detection (see 202 FIGS. 2, 7, 8 and 11) and the dubbing (see 204 FIGS. 2, 8, 9 and 11). At 1104, phrase detection (see 202 in FIGS. 2 and 7) is performed on the vocals (see 300 in FIGS. 3*a* and 7) based on received replacement conditions (see 207 in FIGS. 2 and 7) to obtain a trigger signal (see 703 in FIGS. 3*a*, and 7). At 1105, dubbing (see 204 in FIGS. 2, 3*a*, 8, and 11) on delayed vocals (see 300 in FIGS. 3*a*, 4, 5 and 7) based on received trigger signal (see 703 in FIGS. 3*a*, and 7) and received replacement conditions (see 207 in FIGS. 3*a* and 7) to obtain personalized vocals (see 305 in FIGS. 3*a*, 4 and 6). At 1106, mixing of personalized vocals (see FIGS. 2, 3*a*, 4, 6, 8 and 11) and delayed accompaniment (see FIGS. 2, 8 and 11) is performed to obtain personalized audio (see FIGS. 2, 8 and 11).

In the embodiment of FIG. 12, a flow diagram visualizing a method for signal mixing using phrase detection is described, however, the present disclosure is not limited to the method steps described above. For example, a speech recognition process (see FIGS. 8 and 11) and a content modifier process (see FIGS. 8, 9 and 11) can be performed on the vocals, instead of the phrase detection process, or the like.

FIG. 13 schematically describes an embodiment of an electronic device that can implement the processes of content personalization based on dubbing and music source separation, as described above. The electronic device 1200 comprises a CPU 1201 as processor. The electronic device 1200 further comprises a microphone array 1210, a loudspeaker array 1211 and a convolutional neural network unit 1220 that are connected to the processor 1201. The processor 1201 may for example implement a Phrase Detection 202, a Dubbing 204, a Speech Recognition 701, a Content Modifier 802, and/or a Delay 203 and 205 that realize the processes described with regard to FIG. 2, FIG. 3*a*, FIG. 7, FIG. 8, FIG. 9 and FIG. 10 in more detail. The CNN 1220 may for example be an artificial neural network in hardware, e.g. a neural network on GPUs or any other hardware specialized for the purpose of implementing an artificial neural network. The CNN 1220 may for example implement a source separation 201, and/or a Seq2Seq Model 401 including an Encoder 502-Decoder 505 with Attention 504 architecture that realize the processes described with regard to FIG. 2, FIG. 4 and FIG. 5 in more detail. Loudspeaker array 1211 consists of one or more loudspeakers that are distributed over a predefined space and is configured to render any kind of audio, such as 3D audio. The electronic device 1200 further comprises a user interface 1212 that is connected to the processor 1201. This user interface 1212 acts as a man-machine interface and enables a dialogue between an administrator and the electronic system. For example, an administrator may make configurations to the system using this user interface 1212. The electronic device 1200 further comprises an Ethernet interface 1221, a Bluetooth interface 1204, and a WLAN interface 1205. These units 1204, 1205 act as I/O interfaces for data communication with external devices. For example, additional loudspeakers, microphones, and video cameras with Ethernet, WLAN or Bluetooth connection may be coupled to the processor 1201 via these interfaces 1221, 1204, and 1205. The electronic device 1200 further comprises a data storage 1202 and a data memory 1203 (here a RAM). The data memory 1203 is arranged to temporarily store or cache data or computer instructions for processing by the processor 1201. The data storage 1202 is arranged as a long-term storage, e.g. for recording sensor data obtained from the microphone array 1210 and provided to or retrieved from the CNN 1220.

It should be noted that the description above is only an example configuration. Alternative configurations may be implemented with additional or other sensors, storage devices, interfaces, or the like.

It should be recognized that the embodiments describe methods with an exemplary ordering of method steps. The specific ordering of method steps is, however, given for illustrative purposes only and should not be construed as binding.

It should also be noted that the division of the electronic device of FIG. 13 into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device comprising circuitry configured to perform audio source separation (201) on an audio input signal (1) to obtain a separated source (4; 20; 11) and to perform audio dubbing (204) on the separated source (4; 20; 11) based on replacement conditions (207; 902) to obtain a personalized separated source (305; 13).

(2) The electronic device of (1), wherein the circuitry is further configured to perform lyrics recognition (301) on the separated source (4; 20; 11) to obtain lyrics (30) and to perform lyrics replacement (302) on the lyrics (30) based on the replacement conditions (207; 902) to obtain personalized lyrics (400).

(3) The electronic device of (1) or (2), wherein the circuitry is further configured to perform text-to-vocals synthesis (303) on the personalized lyrics (400) based on the separated source (4; 20; 11) to obtain the personalized separated source (305; 13).
(4) The electronic device of (2) or (3), wherein the circuitry is further configured to apply a Seq2Seq Model (401) on the personalized lyrics (400) based on the separated source (4; 20; 11) to obtain a Mel-Spectrogram (506), and to apply a MelGAN generator (402) on the Mel-Spectrogram (506) to obtain the personalized separated source (305).
(5) The electronic device of anyone of (1) to (4), wherein the circuitry is further configured to perform the source separation (201) on the audio input signal (1) to obtain the separated source (4; 20; 11) and a residual signal (4; 21; 14), and to perform mixing (206) of the personalized separated source (305; 13) with the residual signal (4; 21; 14), to obtain a personalized audio signal (23; 16).
(6) The electronic device of anyone of (1) to (5), wherein the circuitry is further configured to perform delay (203) of the separated source (4; 20; 11) to obtain a delayed separated source (300; 12), and wherein the circuitry is further configured to perform a delaying (205) of the residual signal (21; 14) to obtain a delayed separated source (22; 15).
(7) The electronic device of anyone of (1) to (6), wherein the circuitry is further configured to perform the audio dubbing (204) on the separated source (4; 20; 11) based on a trigger signal (703) to obtain the personalized separated source (305; 13).
(8) The electronic device of (7), wherein the circuitry is further configured to perform phrase detection (202) on the separated source (4; 20; 11) based on the replacement conditions (207; 902) to obtain the trigger signal (703).
(9) The electronic device of (8), wherein the circuitry is further configured to perform speech recognition (701) on the separated source (4; 20; 11) to obtain transcript/lyrics (70).
(10) The electronic device of (9), wherein the circuitry is further configured to perform target phrase detection (702) on the transcript/lyrics (70) based on the replacement conditions (207; 902) to obtain the trigger signal (703).
(11) The electronic device of anyone of (1) to (10), wherein the separated source (4; 20; 11) comprises vocals (20) and the residual signal (4; 21; 14) comprises an accompaniment (22).
(12) The electronic device of anyone of (1) to (11), wherein the separated source (4; 20; 11) comprises speech (20) and the residual signal (4; 21; 14) comprises background noise (22).
(13) The electronic device of (1) or (2), wherein the replacement conditions (207; 902) are age dependent replacement conditions (900).
(14) The electronic device of anyone of (1) to (13), wherein the replacement conditions (207; 902) are obtained via a User Interface (UI).
(15) The electronic device of anyone of (1) to (13), wherein the replacement conditions (207; 902) are a look-up table stored in a database.
(16) The electronic device of (5), wherein the audio input signal (1) acquired by a microphone.
(17) The electronic device of (16), wherein the microphone is a microphone of a device such as a smartphone, headphones, a TV set, a Blu-ray player.
(18) The electronic device of (5), wherein the personalized audio signal (23; 16) is output to a loudspeaker system.
(19) A method comprising:
 performing audio source separation (201) on an audio input signal (1) to obtain a separated source (4; 20; 11); and
 performing dubbing (204) on the separated source (4; 20; 11) based on replacement conditions (207; 902) to obtain a personalized separated source (305; 13).
(20) A computer program comprising instructions, the instructions when executed on a processor causing the processor to perform the method of (19).

The invention claimed is:
1. An electronic device, comprising:
 circuitry configured to
  perform audio source separation on an audio input signal to obtain a separated source and a residual signal, wherein the residual signal includes audio content from the audio input signal other than the separated source,
  delay the separated source by a first delay amount to obtain a delayed separated source, wherein the first delay amount corresponds to a processing latency of phrase detection,
  delay the residual signal by a second delay amount to obtain a delayed residual signal, wherein the second delay amount corresponds to a combined processing latency of the phrase detection and audio dubbing,
  perform audio dubbing on the separated source based on replacement conditions to obtain a personalized separated source, and
  mix the personalized separated source with the delayed residual signal to obtain a personalized audio signal.
2. The electronic device of claim 1, wherein the circuitry is further configured to perform lyrics recognition on the separated source to obtain lyrics and to perform lyrics replacement on the lyrics based on the replacement conditions to obtain personalized lyrics.
3. The electronic device of claim 2, wherein the circuitry is further configured to perform text-to-vocals synthesis on the personalized lyrics based on the separated source to obtain the personalized separated source.
4. The electronic device of claim 2, wherein the circuitry is further configured to apply a Seq2Seq Model on the personalized lyrics based on the separated source to obtain a Mel-Spectrogram, and to apply a MelGAN generator on the Mel-Spectrogram to obtain the personalized separated source.
5. The electronic device of claim 1, wherein the circuitry is further configured to perform the source separation on the audio input signal to obtain the separated source and a residual signal, and to perform mixing of the personalized separated source with the residual signal, to obtain a personalized audio signal.
6. The electronic device of claim 1, wherein the circuitry is further configured to perform the audio dubbing on the separated source based on a trigger signal to obtain the personalized separated source.
7. The electronic device of claim 6, wherein the circuitry is further configured to perform phrase detection on the separated source based on the replacement conditions obtain the trigger signal.
8. The electronic device of claim 7, wherein the circuitry is further configured to perform speech recognition on the separated source to obtain transcript/lyrics.

9. The electronic device of claim 8, wherein the circuitry is further configured to perform target phrase detection on the transcript/lyrics based on the replacement conditions to obtain the trigger signal.

10. The electronic device of claim 1, wherein the separated source comprises vocals and the residual signal comprises an accompaniment.

11. The electronic device of claim 1, wherein the separated source comprises speech and the residual signal comprises background noise.

12. The electronic device of claim 1, wherein the replacement conditions are age dependent replacement conditions.

13. A method comprising:
- performing audio source separation on an audio input signal to obtain a separated source and a residual signal, wherein the residual signal includes audio content from the audio input signal other than the separated source;
- delaying the separated source by a first delay amount to obtain a delayed separated source, wherein the first delay amount corresponds to a processing latency of phrase detection;
- delaying the residual signal by a second delay amount to obtain a delayed residual signal, wherein the second delay amount corresponds to a combined processing latency of the phrase detection and audio dubbing;
- performing dubbing on the separated source based on replacement conditions to obtain a personalized separated source; and
- mixing the personalized separated source with the delayed residual signal to obtain a personalized audio signal.

14. A computer program comprising instructions, the instructions when executed on a processor causing the processor to perform the method of claim 13.

* * * * *